United States Patent [19]

Burkart et al.

[11] 4,111,590

[45] Sep. 5, 1978

[54] POSITIVE FEED DRILL

[75] Inventors: Robert C. Burkart, Fort Wayne, Ind.; Gilbert J. Newbould, North Littleton, Nr Evesham, England

[73] Assignee: Robert E. Eash, Fort Wayne, Ind.; a part interest

[21] Appl. No.: 730,424

[22] Filed: Oct. 7, 1976

[51] Int. Cl.² .............................................. B23B 47/18
[52] U.S. Cl. ...................................... 408/14; 408/130; 488/134
[58] Field of Search .................... 408/11, 14, 130, 134

[56] References Cited

U.S. PATENT DOCUMENTS

| | | | |
|---|---|---|---|
| 2,271,717 | 2/1942 | Schwartz | 408/11 X |
| 3,487,729 | 1/1970 | Juhasz et al. | 408/14 |
| 3,762,827 | 10/1973 | Ziegelmeyer | 408/14 |
| 3,767,313 | 10/1973 | Bohoroquez et al. | 408/14 |

*Primary Examiner*—Frank T. Yost
*Attorney, Agent, or Firm*—Gust, Irish, Jeffers & Rickert

[57] ABSTRACT

A positive feed drill having an elongated spindle mounted for reversible longitudinal motion in a drill housing. The spindle has an hexagonal cross-section with the apices of the hexagon being threaded. A toothed drive gear having a hexagonal aperture centrally thereof has a close sliding fit with the spindle and is mounted for rotating the spindle. A feed gear having a threaded aperture centrally thereof is in threaded engagement with the spindle apices and is selectively rotated at a different rotational speed than the drive gear to longitudinally advance and retract the spindle. A gear for driving the feed gear is pin-slot locked to a motor gear for longitudinal spindle advancement, and is pin-slot locked to the housing for rapid spindle retraction. A pneumatic circuit in cooperation with limit valves and stop members provides completely automatic drilling to an adjustable depth, a dwell, and a positive retract operation with an economy of pneumatic energy. A lost-motion dwell linkage between the spindle and a drill bit provides a longitudinal dwell during which the bit rotates a predetermined number of turns during spindle dwell to provide burr-free polishing.

3 Claims, 14 Drawing Figures

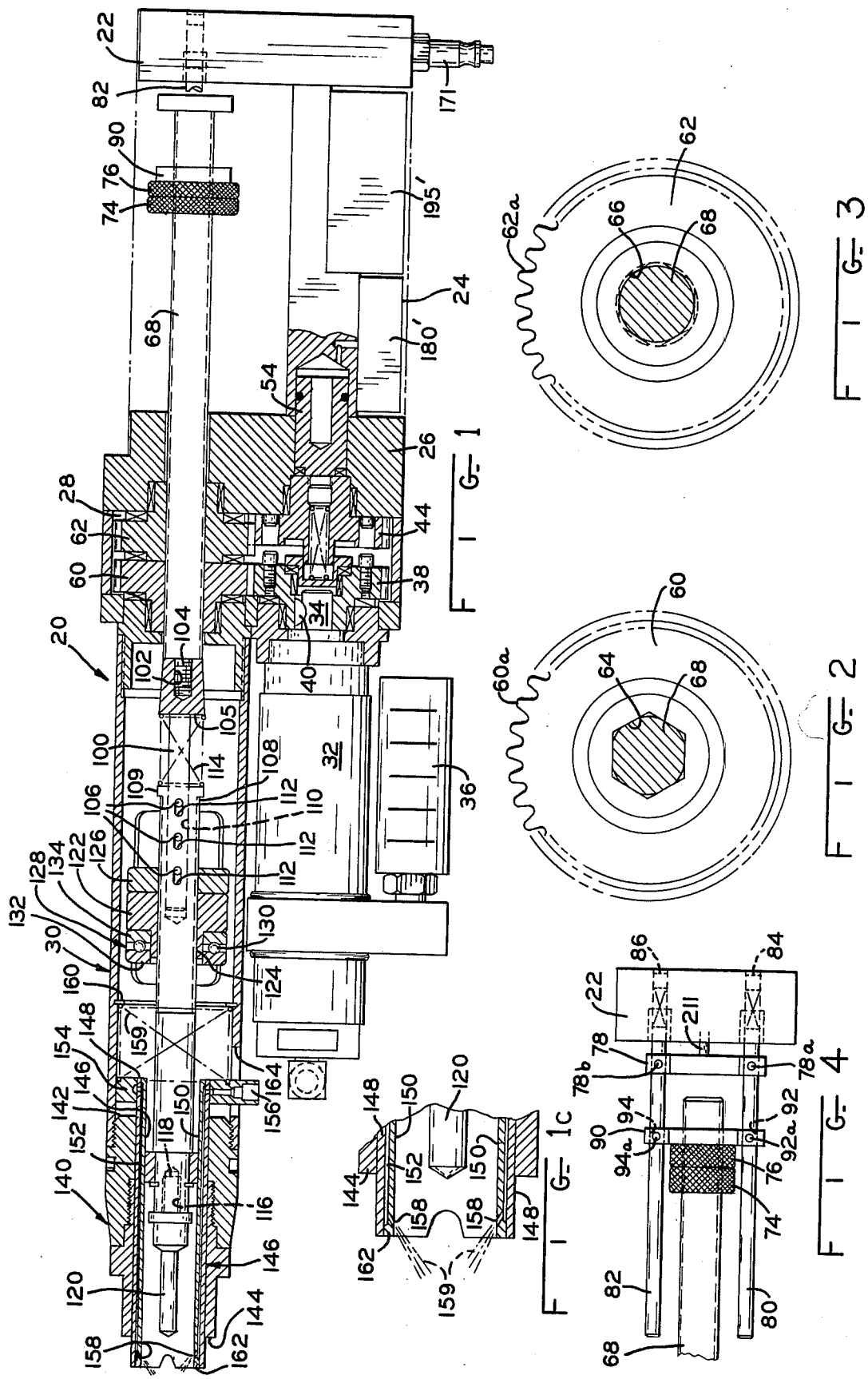

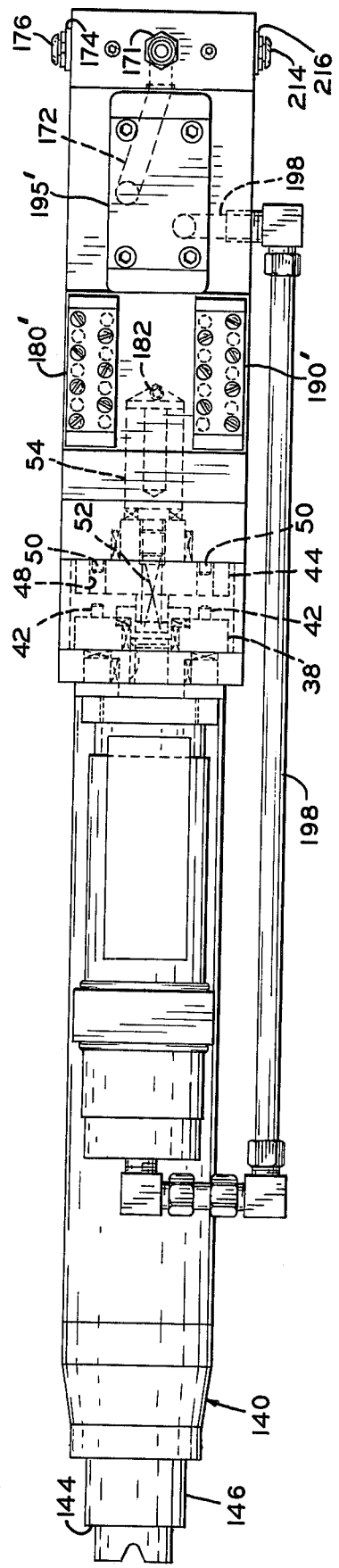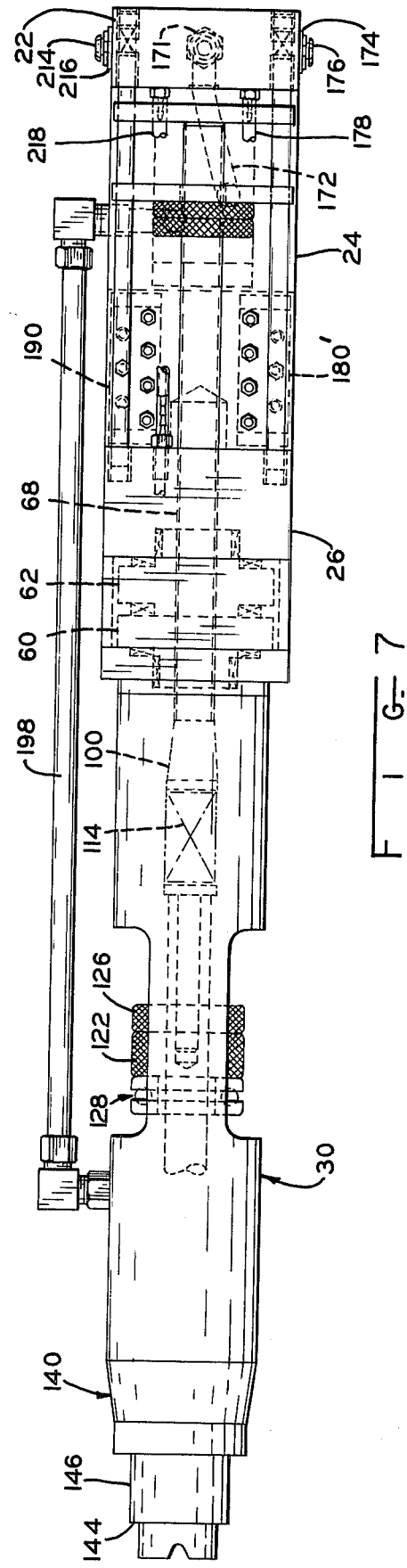

POSITIVE FEED DRILL

BACKGROUND OF THE INVENTION

1. Field of the Invention

This invention is in the field of high pressure, high torque positive feed drills for drilling to precision depths in hard metals, such as titanium.

2. Description of the Prior Art

There have been numerous drill mechanisms utilizing a drive gear and a feed gear driven at a predetermined rotational speed differential to longitudinally advance an elongated spindle carrying a drill bit. These drills have pneumatic controls to advance a drill bit to a given depth and then retract the drill bit. These drills have generally been limited in the torque produced, use excessive pneumatic energy, and have been characterized by bulky construction requiring external drill support at the drilling site thus limiting the drill applications.

SUMMARY OF THE INVENTION

A housing having an elongated passage has supported for rotation and longitudinal travel therein, a spindle having a hexagonal cross-section and being threaded on the apices thereof. A drive gear has a hexagonal aperture centrally therein and the spindle slidably fits therein. A feed gear is threadedly engaged with the spindle and is rotated at a different speed than the drive gear to longitudinally advance the spindle. The feed gear is locked against rotation for rapid retraction of the spindle.

A pneumatic circuit comprising a pneumatic pressure source, pneumatically actuated valves, mechanically operated limit valves, adjustable stop members mounted on the spindle and on guide rods provides fully automatic drill operation. Drill advance to a predetermined depth, a drill bit dwell, rapid drill retraction, and drill stop are achieved. A complete shut-off of pneumatic energy is provided when the drill is stopped to achieve energy economy. The pneumatic circuit and drill mechanical parts are compact and relatively light in weight to permit manual manipulation.

The drive gear is in mesh with a motor-driven gear. The feed gear is in mesh with a piston gear which has a first and second longitudinal position. In the first position the piston gear is locked to the motor gear by means of a plurality of pins extending from the motor gear and inserted in a corresponding plurality of arcuate slots in the piston gear. In the second position, the piston gear is locked to the housing by means of housing pins inserted in the slots. In the first position, the drive gear and feed gear are rotated at different speeds to impart a predetermined longitudinal advance of the spindle and in the second position the feed gear is locked and the spindle is rapidly retracted to a stop position.

A lost motion longitudinal dwell coupling between the spindle and drill bit provides an approximately ten-turn rotation of the bit at the forwardmost bit position while the spindle is dwelling to provide burr-free polishing.

It is therefore an object of this invention to provide a drill compact in size, light in weight, and having a high torque output.

A further object is to provide in the drill of the foregoing object a spindle with a polygonal cross-section that is threaded at the apices of the polygon.

Another object is to provide a locking means between drive and driven gears of simple and rugged construction to advance and retract the spindle.

A still further object is to provide a pneumatic and mechanical circuit of compact and efficient construction to economize in size and pneumatic energy.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partially sectioned side view of a preferred embodiment of this invention;

FIG. 1C is an enlarged view of the front portion of the embodiment of FIG. 1;

FIG. 2 is an enlarged view of the drive gear of FIG. 1 as it is mounted on the hex-rod spindle, which is shown in cross-section;

FIG. 3 is an enlarged view of the feed gear shown in FIG. 1 as it is mounted on the hex-rod spindle, shown in cross-section;

FIG. 4 is a partial, top plan view of the adjustable rear limit stop member;

FIG. 6 is a bottom plan view of the embodiment of FIG. 1;

FIG. 7 is a top plan view of the embodiment of FIG. 1.

DESCRIPTION OF THE PREFERRED EMBODIMENTS

Figure 8:
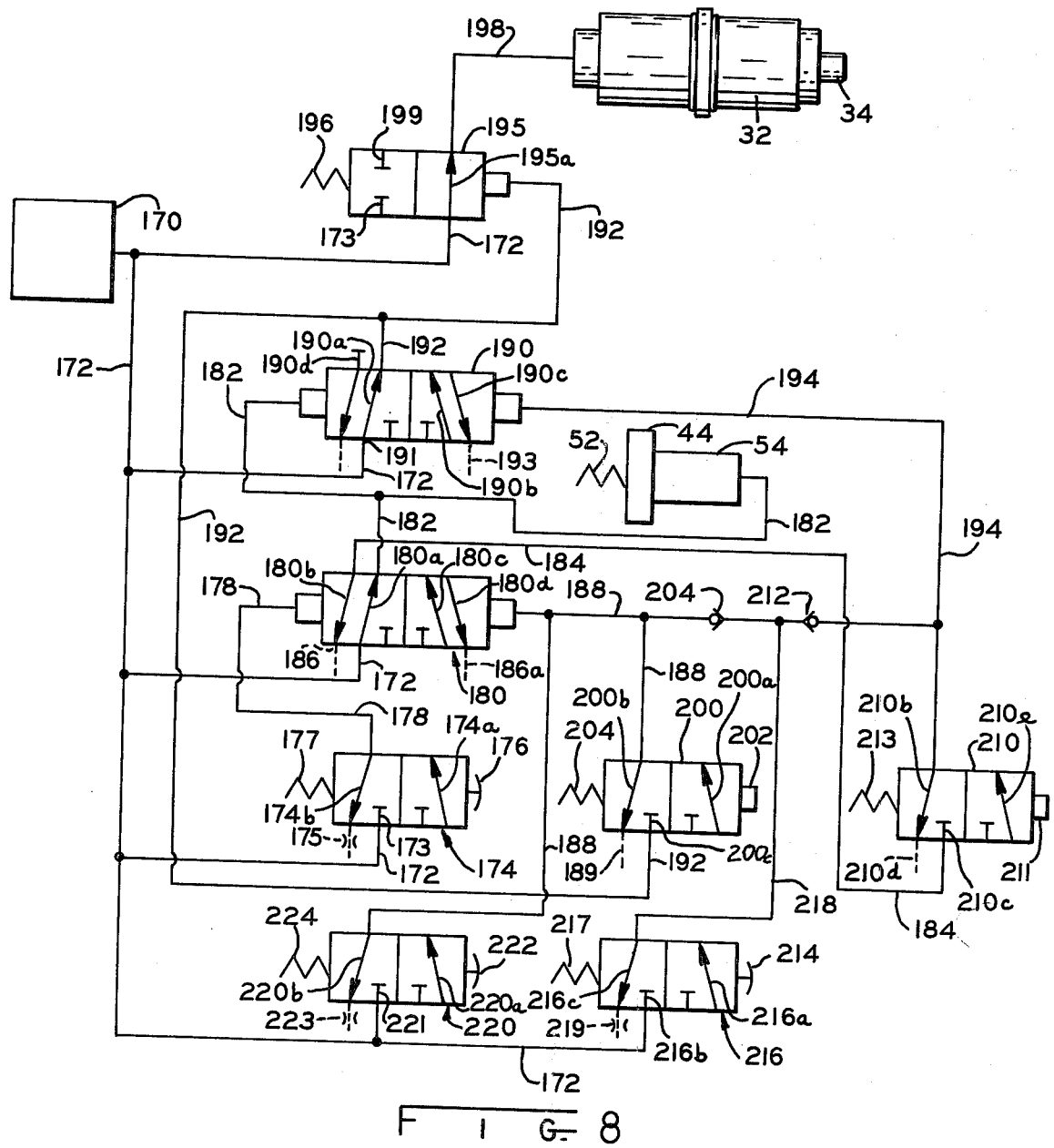
FIG. 8 is a schematic diagram showing the fluid control and drive control elements and valves used for the embodiment of FIG. 1.

Referring to the drawings, elongated housing 20 has rear control block 22, central control block 24, and forward control block 26, and has gear chamber 28 formed centrally therein. Supported at the underside of housing 20 is pneumatic motor 32 driving motor shaft 34. Pneumatic silencer 36 is coupled to motor 32 to maintain quiet motor operation.

Motor gear 38 (FIG. 5) has central aperture 37 for receiving motor shaft 34 and is driven thereby. Key 40 extends inwardly from a slot in gear 38 into a keyway in shaft 34 to provide a driving connection. Two motor gear pins 42 are fixed to gear 38 and extend transversely therefrom. Pins 42 are spaced at 180° intervals near the circumference of gear 38. Gear 38 has gear teeth 38a, formed on the outer circumference thereof. Cap 39 having hub 39a and flange 39b is mounted for rotation centrally of gear 38. Bearing 41a supports hub 39a and thrust bearing 41b supports flange 39b.

Piston gear 44 is longitudinally slidable in hub 39a of cap 39 and is rotatably supported in block 26 by bearings 45. Gear 44 has teeth 44a formed at the outer circumference thereof. Four arcuate slots 48 are formed on centers at 90° intervals adjacent to the outer circumference of gear 44. Two of slots 48 register with pins 42 on gear 38 when gear 44 is in its forward position and register with pins 50, which are fixed to and extend from block 26 at 180° intervals, when gear 44 is in its rearward position. Spring 52 acts between cap 39 and the bottom of bore 53 in gear 44 to urge gear 44 in a rearward direction wherein pins 50 are engaged in slots 48, locking gear 44 against rotation relative to block 26.

Piston 54 is mounted for longitudinal movement in block 26 and is movable by pneumatic pressure in accordance with the fluid control circuit, later described, in a forwardly direction to move gear 44 in a leftward direction as viewed in FIG. 5 against the force of spring 52, until gear 44 abuts gear 38 and pins 42 become inserted in slots 48. In this position, gear 44 is rotatably locked and driven by gear 38.

Figure 5:
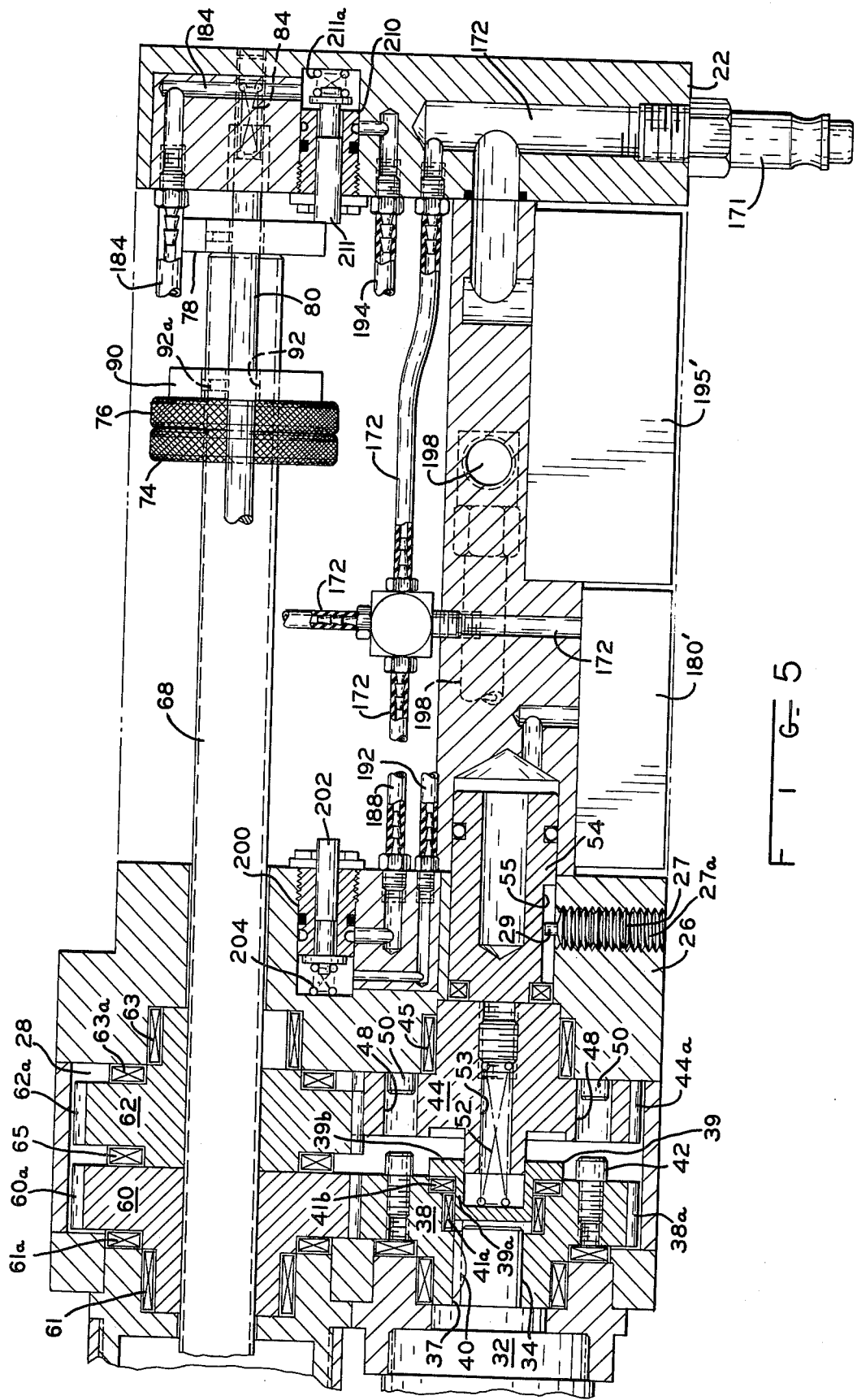
FIG. 5 is an enlarged partially sectioned view of the rear portion of the embodiment of FIG. 1.

Referring to FIG. 5, a longitudinal keyway 55 is formed in the forward end of piston 54. Set screw 27 is threaded into bore 27a of block 26 and has key 29 protruding from the upper end thereof. Screw 27 is threadedly adjustable in bore 27a until key 29 enters keyway 55. Thus piston 54 is free to move longitudinally in block 26 but key 29 in slot 55 restrains rotational movement of valve 54 in block 26. Hence, wear of piston 54 and its seals if the piston were permitted to rotate is greatly reduced.

Drive gear 60 has teeth 60a at its outer circumference. Gear 60 is mounted for rotation in bearing 61 in housing 20. Thrust bearings 61a are also utilized for rotative mounting of gear 60 in gear chamber 28. The teeth 60a of gear 60 are in mesh with the teeth 38a of gear 38.

Feed gear 62 has teeth 62a around its outer periphery which are in mesh with teeth 44a of gear 44. As gear 44 is slidably moved in a longitudinal direction, a relative sliding motion takes place between the meshed teeth 44a and 62a. Gear 62 is mounted for rotation in gear chamber 28 by bearings 63. Thrust bearings 63a are between gear 62 and block 26 and thrust bearings 65 are between gears 60 and 62.

Figure 1A:
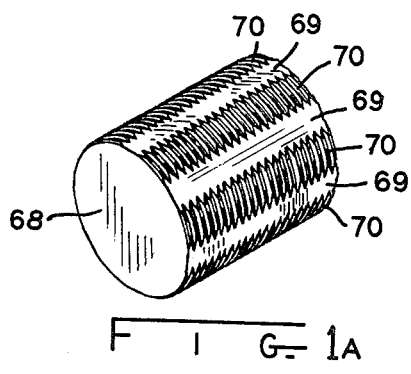
FIG. 1A is a view in perspective of a portion of the hex-rod spindle.
Figure 1B:
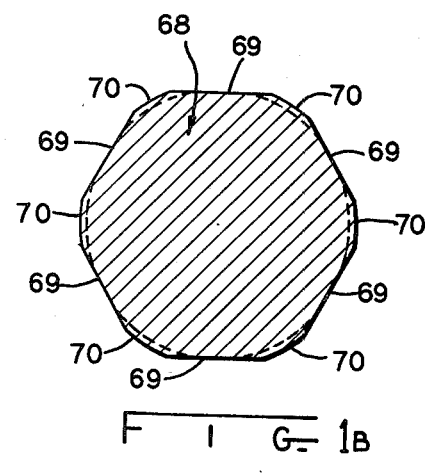
FIG. 1B is an end view of a hex-rod spindle.

Gear 60 has a flat sided hexagonal aperture 64 (FIG. 2) while gear 62 has a threaded circular aperture 66 (FIG. 3) centrally thereof. Received in both apertures 64 and 66 in hex-rod spindle 68 (FIGS. 1A and 1B) having six flat sides 69 which are slidably received by aperture 64 and six threaded apices 70 at the corners thereof which are threadedly received by threaded aperture 66. Thus it is seen that when gears 60 and 62 are rotated at different speeds, elongated spindle 68 will be moved longitudinally according to the speed differential of gears 60 and 62 and the pitch of the threads on spindle 68 and aperture 66. The greater the speed differential and/or the greater the pitch of the thread, the faster spindle 68 will move in a longitudinal direction. Gear 60 applies the rotative force due to the contact between the flat sides of hexagonal aperture 64 and flats 69 on spindle 68. Due to this relatively large surface contact, very high torque can be applied to spindle 68.

Since gears 60 and 62 are designed to be rotated at a predetermined speed differential, spindle 68 will be rotating in the threaded aperture 66 of gear 62 causing it to advance or retract relative thereto. Since gear 62 is mounted for rotative motion only in gear chamber 28 and not for longitudinal movement, spindle 68 thus has imparted thereto a longitudinal movement in housing 20. As will become apparent later, when piston gear 44 is in its forward position and pins 42 are engaged in slots 48, gear 44 will be rotated at the same rotative speed as motor shaft 34, gear 62 rotates faster than gear 60, and spindle 68 will have a forward longitudinal movement imparted thereto. This rotative speed and longitudinal advance can, of course, be varied by varying the gear parameters.

However, when gear 44 is in its rearward position and pins 50 are engaged in slots 48 so that gear 44 is locked against rotation, then gear 62 will also be locked against rotation and the large speed differential between gears 60 and 62 will retract hex-rod spindle 68 at a relatively high rate of longitudinal speed.

Depth nut 74 (FIGS. 1 and 5) is in threaded engagement with threaded apices 70 of spindle 68 and adjustable longitudinally thereof, Lock nut 76 is also in threaded engagement with the apices 70 of spindle 68 and is tightened against nut 74 to prevent relative motion of nut 74 to spindle 68 once it has been adjusted longitudinally thereof to select the depth of drill, as will be later explained.

A pair of parallel, elongated guide rods 80 and 82 are supported in housing 20, and are spring mounted at 84, 86 respectively in rear control block 22 (FIG. 4). Fixed stop member 78 has transversely spaced apertures which receive rods 80 and 82. Set screws 78a and 78b are tightened upon rods 80 and 82, respectively, to hold member 78 thereto. Adjustable rear stop member 90 has guide apertures 92 and 94 for slidably receiving rods 80 and 82 respectively. Set screws 92a and 94a are threadedly engaged with member 90 and are tightened upon rods 80 and 82, respectively, to hold member 90 in a given longitudinal position relative to rods 80 and 82. As will become apparent, the relative longitudinal position of member 90 on rods 80, 82 determines the rearward travel limit of spindle 68. Nut 76 is registerable with member 90 to impart a rearward travel to rods 80 and 82 against springs 84 and 86 respectively, causing stop member 78 to actuate rear limit valve 210 (FIG. 5), as later explained. In the event member 90 has not been set, or set improperly, the rearward travel of spindle 68 will be halted by the rearward end of spindle 68 engaging member 78 to actuate valve 210.

By adjusting depth nut 74 on spindle 68 and properly positioning member 90, the forward and rearward limits of travel of spindle 68 are set.

The drill of this invention accomplishes precision drilling to a predetermined depth typically in extremely hard metallic material, such as titanium. At the end of the forward travel of the drill, in the drilling sequence, a dwell mechanism is provided wherein the drill turns approximately ten revolutions to remove burrs and otherwise provide a highly polished drilled aperture, before the drill is rapidly retracted. Further, a pressurized annular coolant spray is played on the drill and the drilled surface during drilling sequence at the annular mouth of a spring-loaded skin sensing sleeve through which the drill advances.

Elongated drive adapter 100 (FIG. 1) has threaded socket 102 which is threadedly engaged with end 104 of spindle 68. The pitch of the threads are in a direction so that during the drilling operation, the threaded engagement between end 104 and socket 102 is tightened. Drive pins 106 extend transversely from adapter 100 and are spaced longitudinally therealong.

Elongated drive rod 108 has socket 110 which receives the forward end of adapter 100. Longitudinally spaced dwell slots 112 are in the walls of socket 110 and receive pins 106. High compression spring 114, such as a Belleville spring washer, is mounted between flange 109 on socket 110 and shoulder 105 on adapter 100 to urge rod 108 in a forward direction. During drilling spring 114 is of sufficient strength to maintain pins 106 in contact with the rearward ends of slots 112.

The forward end of rod 108 has threaded socket 116 for receiving threaded stub 118 of a tool bit 120. Typically, bit 120 is a hardened metal drill suitable for use in very high pressure, high torque drill applications. Rod 108 is threaded on its outer surface and threadedly receives dwell nut 122 which is adjustable longitudinally of rod 108. Nut 122 has annular flange 124 at its forward end. Lock nut 126 is threadedly mounted on rod 108 and tightened against nut 122 to lock it in position on rod 108.

Thrust bearing 128 has ball bearings 130 caged between bearing sections 132 and 134 which are fitted on flange 124 so that section 132 has a low friction, rotatable mounting relative to section 134.

Annular nose piece assembly 140 is mounted at the forward end of tubular assembly 30 and has annular shoulder stop member 142 formed rearwardly thereof and annular rim 144 at the forward end thereof. Slidably mounted in assembly 140 is skin sensing assembly 146 having outer sleeve 148 and inner sleeve 150 supported concentrically with sleeve 148 so as to define an annular coolant flow space 152 therebetween. Mounted at the rearward end of assembly 146 is coolant adapter ring 154 which is made of a hardened metallic material in which is formed a radial passage 156 communicating with annular space 152. A source of pressurized coolant liquid (not shown) is attached to passage 156 and coolant is then admitted under pressure to space 152 and sprayed from annular nozzle 158 at the forward end of assembly 146, as at 159 (FIG. 1C). Thus, a ring of coolant spray is focused on the drill and the workpiece.

Assembly 146 is forwardly urged by compression spring 159 which acts against circular clip 160 mounted in fixed relation to housing assembly 30. Contact between the workpiece surface and end 162 of outer sleeve 148 causes rearward retracting movement of sleeve 146 within nose assembly 140 as shown in FIG. 1. When drill bit 120 is advanced to the workpiece, thrust bearing 128 will contact ring 154 and thus advance sleeve 148, maintaining skin contact and coolant spray at the drilling area. Longitudinal slot 164 in the lower portion of housing 30 permits longitudinal movement of passage 156 relative to housing assembly 30 as sleeve assembly 146 is longitudinally moved.

FIG. 8 is a schematic showing of a number of fluid valves each of which have multiple valve positions. These positions are obtained by manual actuation, fluid pressure, or physical contact with limit stops on the drill spindle. These valves, and the passages therebetween, are mounted to obtain their multiple positions and have connecting passages as shown in FIG. 8 in rear control block 22, center control block 24, and forward control block 26. In the drawings, and in particular FIGS. 1, 5, 6 and 7, certain of the valves and connecting passages are shown although every passage is not completely shown nor is each valve completely shown. It is well within the state of the art to provide standard valves and connecting passages to accomplish the operation of the circuit shown and described in FIG. 8, and therefore each valve and each connecting passage are not shown in detail.

A pneumatic supply is shown schematically at 170 and provides line 172 with supply pressure. Start valve 174, which has a manually operated button 176, is mounted transversely in block 22 and has its valve spool urged by spring 177 to the rightward position shown in FIG. 8, wherein line 172 is blocked at stop 173. When the spool of valve 174 is moved leftwardly by manual pressure on button 176, fluid connection is made between supply line 172 and first line 178 through valve passage 174a. Control valve 180, mounted in block 24 under cover 180' (FIGS. 5, 6 and 7), is mounted for reciprocal motion and is moved rightwardly in response to supply pressure in line 178 to the position shown in FIG. 8 to connect line 172 to second line 182 through valve passage 180a and to connect third line 184 to exhaust 186 through valve passage 180b. Piston 54, as previously described, is mounted in block 26 for reciprocal movement and is urged by spring 52 acting against gear 44 rearwardly of the drill, (rightwardly in FIG. 8). Upon the presence of supply pressure in line 182, piston 54 is moved forwardly (leftwardly in FIG. 8) to cause spindle 68 to advance as previously described. Supply pressure in fourth line 188 moves the spool of valve 180 in a leftward direction, as shown in FIG. 8, to disconnect line 172 from line 182 and also to connect line 172 with line 184 through valve passage 180c and at the same time connect line 182 to exhaust 186a through passage 180d.

Control valve 190 mounted in block 24 under cover 190' (FIGS. 6 and 7), has its spool urged to its rightward position (as shown in FIG. 8) upon supply pressure being present in line 182 and in this rightward position connects line 172 at port 191 to fifth line 192 through valve passage 190a. Valve 190 has its spool moved leftwardly upon removal of supply pressure from line 182 and presence of supply pressure in sixth line 194. In such leftward position, the supply pressure in line 172 and valve passage 190b is blocked by stop 190d and line 192 is exhausted at exhaust 193 through valve passage 190c.

Motor valve 195 mounted in block 24 (under cover 195' FIGS. 5 and 6), has its spool urged rightwardly by spring 196 and moved leftwardly against this spring pressure by the presence of supply pressure in line 192, and is shown in its leftward position in FIG. 8. In this position, line 12 is connected to seventh line 198 through valve passage 195a to actuate motor 32. In the rightward position of valve 195, line 112 is blocked at stop 173 and line 198 is blocked at stop 199.

As previously described, depth nut 74 is adjustable on spindle 68 and is carried forward with the spindle in the drilling operation. The forward travel limit of spindle 68 is defined when nut 74 moves the spool of depth valve 200 by, engaging its end 202, leftwardly against spring 204, until the supply pressure in line 192 is connected to line 188 through valve passage 200b, moving the spool of valve 180 leftwardly against the pressure exerted by the fluid in line 178 and valve passage 174b being forced through restriction 175 in valve 174 to impart a controlled leftward movement to the spool of valve 180. The leftward position of the spool of valve 180 connects line 184 to supply pressure in line 172 through valve passage 180c and connected line 12 to exhaust 180a through passage 180c. Check valve 204 prevents flow from line 188. In the rightward position of valve 200, line 188 is connected through valve passage 200b to exhaust 189 and line 192 is blocked to stop 200c.

Removal of supply pressure from line 182 causes piston 54 to move rearwardly under the force of spring 52 which results in a rapid retraction in a rearward direction of spindle 68 as previously described. The retraction in a rearward direction of spindle 68 continues until adjustable stop 90 is contacted by lock nut 76 causing stop member 78 to engage end 211 of the spool of valve 210 moving it leftwardly (FIG. 8) or rearwardly (FIG. 1) against spring 213. In the leftward position, line 194 is disconnected from passage 210b and exhaust 210d and is connected to the supply pressure that is now in line 184 through valve passage 210e to move the spool of valve 190 leftwardly thus removing supply pressure from line 192. Line 184 in the rightward position of valve 210 is blocked at stop 210c. The removal of supply pressure from line 192 causes the spool of valve 195 to move rightwardly under the force of spring 196 to disconnect supply pressure from line 198 and turn off motor 32. Check valve 212 prevents flow from line 194. At this point, the motor is off and all supply pressure outlets are blocked thus conserving energy.

The cycle may be stopped at any time by manually depressing button 214 of stop valve 216 moving its spool leftwardly (FIG. 8) and connecting an eighth line 218 to supply pressure in line 172 through passage 216a. Lines 188 and 194 are thus connected, through check valves 204 and 212, respectively to supply pressure, moving the spools of valves 180 and 190 leftwardly to stop motor 32 as previously described. In the rightward position of valve 216, line 172 is blocked at stop 216b and line 218 is connected to restricted exhaust 219 through passage 216c. Remote depth valve 200 may be provided to be manually actuated to reverse the forward travel of spindle 68. Leftward movement of the spool of valve 220 by manual actuation of button 222 against spring 224 will serve to connect supply pressure from line 172 to line 188 through valve passage 220a thus actuating piston 54 to reverse spindle 68 as previously described. In the rightward position of valve 220, line 172 is blocked at stop 221 and line 188 is connected to restricted exhaust 223 through passage 220b. With the fluid circuitry of this invention, supply pressure is blocked when not in use to minimize energy waste.

OPERATION

In operation of the positive feed drill shown in the preferred embodiment, before the drill is actuated, depth nut 74 is adjusted on spindle 68 to set the forward travel limit of spindle 68. Lock nut 76 is tightened against nut 74. Stop member 90 is then adjusted on guide rods 80 and 82 to set the rear travel limit of spindle 68 and determine that point at which the cycle is completed and the motor 32 is turned off. When depth nut 74 is adjusted, dwell nut 122, and lock nut 126, are correspondingly adjusted on drive rod 108.

To initiate operation, button 176 on start valve 174 is depressed which introduces supply pressure into line 178 moving the spool of valve 180 to the left (FIG. 8) supplying pressure to piston 54 which then moves gear 44 forwardly with respect to the drill against spring 52 until slots 48 in gear 44 engage pins 42 establishing a driving connection therebetween. Further, supply pressure is applied to valve 190 moving its spool rightwardly (FIG. 8) supplying pressure to valve 195 to move its spool leftwardly (FIG. 8) against spring 196 to actuate motor 32 imparting rotational motion to shaft 34. Shaft 34 through key 40 drives motor gear 38 which in turn drives piston gear 44 through pins 42 and slots 48. Gear 38 is in mesh with drive gear 60 rotating it at a predetermined speed and gear 44 is in mesh with feed gear 62 rotating it at a speed higher than that of gear 60. Gear 60 provides a high torque drive to hex-rod spindle 68. Feed gear 62 is in threaded relation with the threaded apices 70 of hex-rod 68 causing spindle 68 to longitudinally advance at a predetermined rate, which is possible due to the longitudinal sliding contact between aperture 64 and hex-rod spindle 68.

Spindle 68 advances drill bit 120 toward the workpiece. A coolant mist sprayed from annular nozzle 158 of assembly 146 onto the workpiece area being drilled. Drilling takes place after bit 120 contacts the workpiece and continues until depth nut 74 contacts the spool of valve 200 moving it leftwardly against spring 204, causing supply pressure to move the spool of valve 180 leftwardly thus disconnecting supply pressure to line 182 so that gear 44 and piston 54 move rearwardly under the force of spring 52 to disengage pin 42 from slots 48 and cause engagement between pins 50 and slots 48 thus locking gear 44 in a stationary position. Thus also locks gear 62 from rotation and since gear 60 is continuing to rotate, and at a much faster rate than gear 62, spindle 68 is caused to rapidly retract in a rearward direction under a positive drive force. This retraction continues until lock nut 76 contacts stop 90 which moves guide bars 80 and 82, and thus stop 98 rearwardly against the spool of rear limit valve 210. Valve 210 has its spool moved against spring 213 thus supplying line 194 with supply pressure to move the spool of valve 190 leftwardly, removing supply pressure from line 192 whereby the spool of valve 195 will move rightwardly under the force of spring 196 to cut off motor 32. The drill is not in "off" position and pneumatic supply lines have been blocked, thereby conserving energy.

A manual stop is provided and may be actuated by depressing button 214 moving the spool of valve 216 to leftwardly against spring 217, placing supply pressure in line 218 to check valves 204 and 212 to respectively supply pressure to lines 188 and 194 which moves the spools of valves 180 and 190 leftwardly and piston 54 rightwardly, disengaging gear 44 and stopping motor 32. Spindle 68 also may be reversed, at any point in its forward travel, by depressing button 222 manually to move the spool of valve 220 leftwardly against spring 224 and to supply pressure to line 188 thus to move the spool of valve 200 to move it leftwardly, thrust bearing 128 has already abutted ring 154. At this point the drilling depth has been completed and spindle 68 is beginning its rearward retraction. During reversal of spindle 68, pins 106 move in slots 112, compressing spring 114. The forward travel of drill bit 120 is maintained at the drill depth while pins 106 are moving in lost motion slots 112. During this period, drill bit 120 is rotating at drill depth to provide a polished finish and remove all burrs. After pins 106 have completed their travel in slots 112, drill bit 120 will be retrated with spindle 68.

Figure 9:
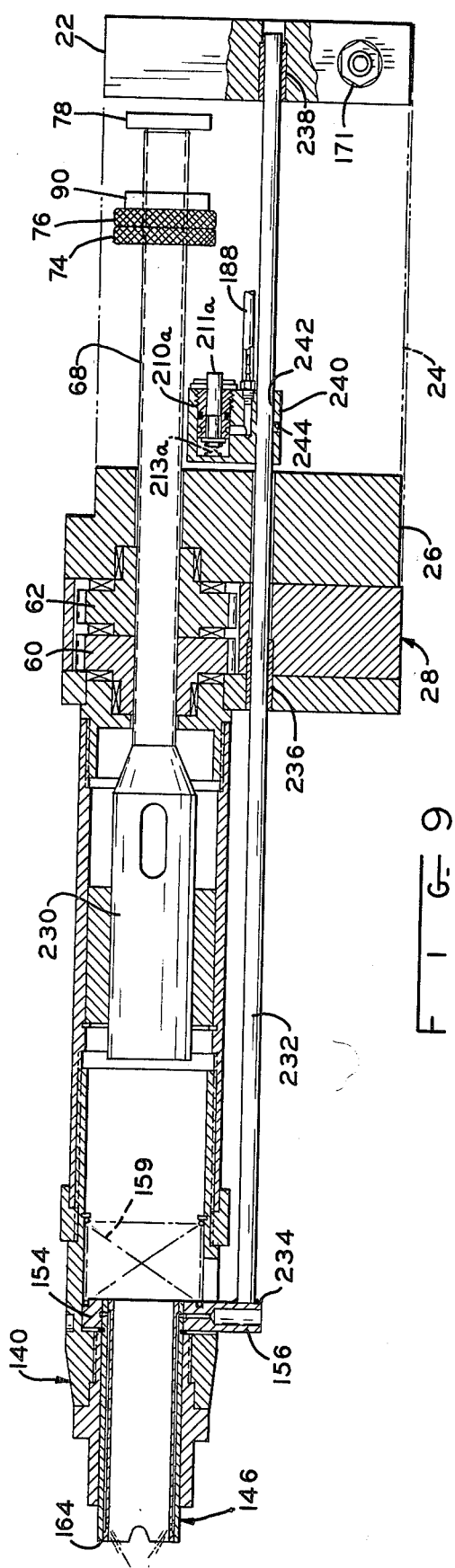
FIG. 9 is a partial top plan view of another preferred embodiment, shown partially in section.
Figure 5B:
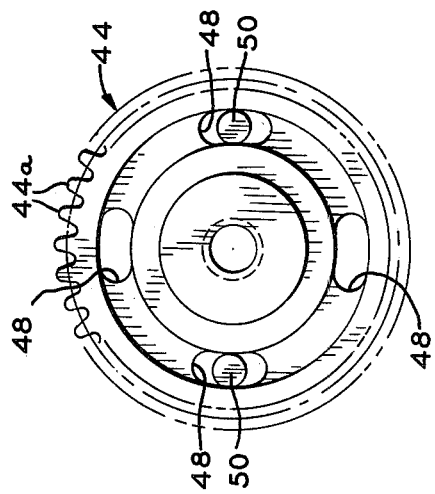
FIG. 5B is an enlarged end view of the piston gear in its rearward position and engaged with the housing pins.
Figure 5A:
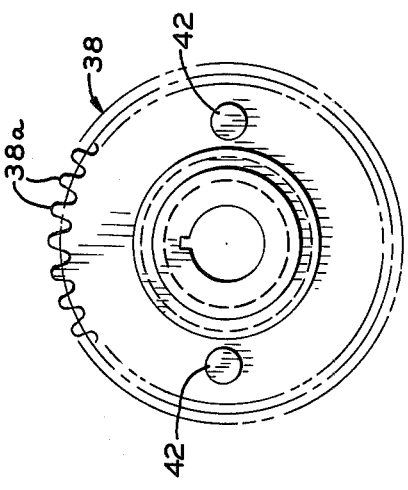
FIG. 5A is an enlarged end view of the motor gear of the embodiment of FIG. 5.

Referring to FIG. 9, a further embodiment is partially shown in top plan view and partially in section. This embodiment operates generally in the manner of the previous embodiment and parts common to the previous embodiment carry the same reference numerals. In the embodiment of FIG. 9, there is no dwell assembly and the forward limit valve 210a, while functioning in the same manner as valve 210 in the previous embodiment, is adjustable longitudinally of the drill. In the embodiment of FIG. 9, the parts of valve 210a common to those of valve 210 in the previous embodiment will be designated with the same reference numerals followed by the suffix "a".

An elongated drive adapter 230 is carried by and in threaded engagement with spindle 68. Adapter 230 receives an elongated drill bit (not shown) in fixed relation thereto, there being no lost motion dwell assembly connecting adapter 230 and the drill bit as in the previous embodiment. An elongated skin sensing rod 232 is affixed, as by welding at 234, to coolant mist adapter ring 154 adjacent passage 156 and extends longitudinally of the drill. Rod 232 is slidably supported by guide bushing 236 mounted in gear housing 28 and in guide bushing 238 mounted in block 22. Forward limit valve housing 240 carries limit valve 210a having contact 211a which is depressible against spring 213a to effect spindle 68 reversal as described for the previous embodiment. Housing 240 has bore 242 for slidably receiving rod 232 and set screw 244 mounted in housing 244 which can be tightened against rod 232 for clamping housing 240 to rod 232 once the desired longitudinal relation therewith has been obtained.

In the operation of the embodiment of FIG. 9, the drilling depth, or forward limit of spindle 68, is determined by loosening set screw 244 and moving housing 240 forwardly or rearwardly on rod 232. If housing 240 is moved rearwardly, a more shallow drilling depth is obtained whereas if housing 240 is moved forwardly on rod 232, a deeper drilling depth is obtained. Set screw 244 is then tightened to clamp housing 240 relative to rod 232. The drill is then placed against the workpiece (not shown) at which time end 164 of skin sensing assembly 146 contacts the workpiece. As previously explained, assembly 146 is slidably mounted in assembly 140 against the force of spring 159. When assembly 146 is moved against spring 159, rod 232 is likewise moved in bushings 236 and 238 and the housing 240 is also moved. The drill is actuated as explained for the previous embodiment and forward longitudinal movement of spindle 68 takes place until stop nut 74 engages and depresses contact 211a, causing reversal of spindle 68 as described for the previous embodiment. In this manner, an "under drill" is prevented which otherwise may occur if assembly 146, for any reason, is not fully retracted in nose assembly 140 during the drilling operation. Thus, each and every drilling operation will be to the full drilling depth which corresponds to the position of housing 240 on rod 232. The drilling depth is related to the position of skin sensor 146 rather than to the position of the drill housing 20.

While there have been described above the principles of this invention in connection with specific apparatus, it is to be clearly understood that this description is made only by way of example and not as a limitation to the scope of the invention.

What is claimed is:

1. Drill apparatus comprising a supporting frame which carries an elongated spindle for rotary and longitudinally reversible movement; drive means for selectively imparting protractile and tractile movement of said spindle and for rotating said spindle; a rotary drilling tool; coupling means for coupling said drilling tool to said spindle to impart said rotary and longitudinal movements thereto; limit means for controlling said drive means to limit the protractile movement of said tool; said coupling means including a lost-motion connecting means for providing limited relative longitudinal movement between said tool and spindle when the protractile movement of said tool is limited; said drive means comprising retraction means for retracting said spindle upon said tool reaching its protracted limit; said coupling means including a drive rod connected to said drilling tool and an adaptor carried by said spindle, one of said drive rod and adaptor having an axially extending socket therein, the other of said drive rod and adaptor telescopically fitting into said socket for relative axial movement therein, axially extending slots through the wall of the socket, radial pins slidably received by said slots and carried by the drive rod and adaptor which is telescoped in said socket, whereby said drive rod and adaptor have limited axial movement relative to each other; said lost-motion means maintaining said tool in its protracted limit position during the period required to change from protractile to retractile movement of said tool.

2. The device of claim 1 wherein said lost-motion means comprises a resiliently deflectable device interposed between said drive rod and said adaptor for urging said tool and said spindle apart and having a spring force sufficiently strong to exert a protractile drilling force substantially without deflection of said resilient device.

3. Drill apparatus according to claim 1 further comprising:
 a thrust bearing longitudinally adjustable of said tool;
  a protractile stop member supported on said frame;
  said bearing being operatively engageable with said stop member to longitudinally arrest said tool during the period required to change from protractile to retractile movement of said tool and provide relative rotational motion between said tool and said stop member.

* * * * *

UNITED STATES PATENT AND TRADEMARK OFFICE
CERTIFICATE OF CORRECTION

PATENT NO. : 4,111,590
DATED : September 5, 1978
INVENTOR(S) : Robert C. Burkart, Gilbert J. Newbould It is certified that error appears in the above-identified patent and that said Letters Patent are hereby corrected as shown below:

Col. 4, line 16, "," should be --.--.

Col. 6, line 46, "12" should be --172--.
Col. 6, line 48, "112" should be --172--.
Col. 6, line 64, "12" should be --182--.
Col. 7, line 33, "200" should be --220--.
Col. 8, line 22, "Thus" should be --This--.
Col. 8, line 35, "not" should be --now--.
Col. 8, line 39, after "216" delete --to--.
Col. 8, line 59, "retrated" should be --retracted--.
Col. 10, line 10, "tractile" should be --retractile--.

Signed and Sealed this

Fifth Day of June 1979

[SEAL]

Attest:

RUTH C. MASON
Attesting Officer

DONALD W. BANNER
Commissioner of Patents and Trademarks